United States Patent [19]

Hamar

[11] Patent Number: 4,844,618

[45] Date of Patent: Jul. 4, 1989

[54] ALIGNMENT APPARATUS WITH SINGLE MODE FIBER OPTIC STABILIZER

[76] Inventor: Martin R. Hamar, 70 Linden Tree Rd., Wilton, Conn. 06897

[21] Appl. No.: 61,917

[22] Filed: Jun. 11, 1987

[51] Int. Cl.$^4$ ............................................. G01B 11/00
[52] U.S. Cl. .................................................. 356/400
[58] Field of Search ................ 356/399, 400, 401, 375

[56] References Cited

U.S. PATENT DOCUMENTS

| | | | |
|---|---|---|---|
| 3,527,539 | 9/1970 | Studebaker | 356/400 |
| 3,535,525 | 10/1970 | Minkowitz | 356/400 |
| 3,902,810 | 9/1975 | Hamar | 356/138 |
| 4,154,529 | 5/1979 | Dyott | 356/28 |
| 4,170,401 | 10/1979 | Yoder Jr. et al. | 356/138 |
| 4,325,638 | 4/1982 | Takeda et al. | 356/375 |
| 4,456,330 | 6/1984 | Blüdaü350 | 96.18/ |
| 4,460,241 | 7/1984 | Cohen | 350/96.18 |
| 4,475,788 | 10/1984 | Tomassini et al. | 350/96.18 |
| 4,479,717 | 10/1984 | Cornillault | 356/375 |
| 4,483,618 | 11/1984 | Hamar | 356/400 |
| 4,542,956 | 9/1985 | McCrickerd | 350/96.18 |
| 4,632,199 | 12/1986 | Ober et al. | 177/238 |
| 4,712,912 | 12/1987 | Messerschmidt | 356/445 |

FOREIGN PATENT DOCUMENTS

| | | | |
|---|---|---|---|
| 1904 | 1/1982 | Japan | 356/375 |
| 245013 | 10/1986 | Japan | 356/375 |

*Primary Examiner*—Richard A. Rosenberger
*Attorney, Agent, or Firm*—Anthony J. Casella; Gerald E. Hespos

[57] ABSTRACT

An apparatus is provided for achieving accurate alignment of parts relative to one another. The apparatus comprises a light source that is operative to produce a beam of light. The light source is disposed in proximity to a focusing aid which in turn is disposed in proximity to one end of a single mode optical fiber. The opposed end of the single mode optical fiber may be disposed at any selected spacing and any selected angular alignment with respect to the first end of the single mode optical fiber. The apparatus further includes a collimating lens disposed in proximity to the second end of the optical fiber. Preferably, the second end of the optical fiber is spaced from the collimating lens by the focal length thereof. As a result, the apparatus will produce a well focused beam of light. More particularly, the beam of light emanating from the collimating lens will remain spatially stable despite variations in the attitude of the incoming beam.

5 Claims, 1 Drawing Sheet

ALIGNMENT APPARATUS WITH SINGLE MODE FIBER OPTIC STABILIZER

BACKGROUND OF THE INVENTION

Many industrial processes require a particular spatial relationship to be established between a plurality of parts. One common example pertains to industrial machining operations where a machine tool, such as a drill reamer, punch or tap must be aligned relative to a workpiece. Misalignment can result in poorly manufactured products and/or broken tools. In other situations, it is important to properly align a plurality of movable components with respect to a fixed frame of reference. For example, it may be necessary to align a plurality of turbine parts with respect to an axis of rotation, or to align an assembly of robotic arms with respect to a reference plane.

Until fairly recently, the tools available to industries for these alignment purposes consisted primarily of levels, feeler gauges, stretched piano wires, telescopes and such. In fact, these tools are still employed in many industries.

Some industries require precision that cannot readily be obtained with the prior art mechanical, electromechanical and optical alignment tools. For example, industries that have become highly automated rely upon the precise spatial and angular orientation of tools relative to one another and relative to workpieces. As noted above, improper alignment in these situations can result in high reject rates and tool breakages. Even a short down time for a highly automated transfer line can be extremely expensive.

The need for increased precision and for minimizing down time has made alignment systems employing light sources and accurate photoelectric targets a desirable approach for many industries. In particular, alignment devices employing laser light were developed some twenty years ago. The typical prior art laser alignment device comprises a laser emitter and an electronic target including at least one photocell that is responsive to produce electrical output signals capable of identifying locations of points at which the target is impinged upon by light. The target typically is operative to sense the center of energy of the laser light impinging thereon. Targets are available to provide accuracy within 0.0001 inch, which is a small fraction of the diameter of a human hair. In the typical application, the emitter and the target are positioned at predetermined locations relative to the industrialequipment to be aligned. Extremely precise adjustments then can be made to the alignment of the industrial equipment utilizing the output from the alignment system. Several very desirable variations of the above described alignment system have been developed. For example, U.S. Pat. No. 3,902,810 which issued to Martin R. Hamar on Sept. 2, 1975 is entitled SYSTEM AND METHOD FOR ALIGNING APPARATUS UTILIZING A LASER, and shows a laser system particularly effective for aligning members, such as turbine parts, along a particular axis. Another efficient laser alignment system is shown in U.S. Pat. No. 4,297,031 and U.S. Pat. No. 4,382,680, both of which issued to Martin R. Hamar and are entitled APPARATUS AND PROCESS FOR SWEEPING A FLAT OPTICAL LIGHT PLANE. Still another very efficient laser alignment system is shown in U.S. Pat. No. 4,566,202 which issued on Jan. 28, 1986 to Martin R. Hamar and is entitled LASER APPARATUS FOR EFFECTIVELY PROJECTING THE AXIS OF ROTATION OF A ROTATING TOOL HOLDER.

Most of the prior art laser alignment systems rely in part upon the accurate placement of the target relative to a desired measurement point. It follows, therefore, that a misplacement or misalignment of the target relative to the desired measurement point can offset the extreme accuracies that otherwise could be obtained with laser alignment systems. A particularly effective target to compensate for possible misalignment is shown in U.S. Pat. No. 4,483,618 which issued to Martin R. Hamar on Nov. 20, 1984 and is entitled LASER MEASUREMENT SYSTEM, VIRTUAL DETECTOR PROBE AND CARRIAGE YAW COMPENSATOR. Another prior art means for achieving stability and accuracy with a laser alignment system is shown in U.S. Pat. No. 4,045,129 which issued to Martin R. Hamar on Apr. 30, 1977 and is entitled APPARATUS FOR HARD MOUNTING AN OPTICAL MEMBER TO A RIGID BASE. The disclosures of the above identified United States Patents to Martin R. Hamar are incorporated herein by reference.

The photocells of the above described alignment targets typically are operative to sense the center of energy of light impinging thereon. Therefore, it is generally important to provide a laser emitter that will produce a stable and collimated beam of light. An unstable beam of light may have a center of energy that is substantially offset from the geometric center of the beam. Similarly, a laser emitter producing a beam that is misaligned or not properly collimated may give imprecise readings in certain applications. Many laser sources include complex and costly optical compensating devices incorporated therein. For example, U.S. Pat. No. 4,170,401 which issued to Yoder et al on Oct. 9, 1979, shows one such compensating system employing at least five optical components which are operative to first split the incoming beam, rotating the wavefront of one of the split portions of the beam and then recombining the two components. Other equally complex systems have been developed to stabilize light beams. The various optical members of such systems must be properly and securely mounted relative to one another and relative to the housing in which the laser source is disposed. Additionally, the precise positions at which the various optical members are disposed can be changed due to thermal expansion caused by the heat of the laser system itself. The mountings required for the optical members to prevent or offset the effects of thermal expansion also contribute to manufacturing expenses.

Recently, it has become desirable to achieve precise alignment of structural members which are disposed in a potentially explosive environment, such as an environment in which highly volatile fuels are used (e.g. missile launching or fueling stations). Prior art laser alignment systems which generate heat or which create a possibility of electrical short circuits generally can not be employed in these environments.

In view of the above, it is an object of the subject invention to provide an industrial alignment system that can efficiently produce a spatially stable light beam.

It is another object of the subject invention to provide an alignment system that substantially reduces and simplifies the optical components required therein.

It is another object of the subject invention to provide an alignment system wherein the heat generating portions thereof can be spaced from the light emitting portions thereof.

It is another object of the subject invention to provide a laser alignment system that can be manufactured with substantial cost savings.

SUMMARY OF THE INVENTION

The subject invention is directed to an alignment apparatus comprising a light source, a single mode optical fiber and a collimator. The light source may be operative to generate a laser and in particular, the light source may be a helium neon laser. The laser source may further be a single mode solid state diode laser. The single mode optical fiber is operative to permit only a single mode of light transmission. The apparatus may further comprise additional optics, such as a rotating penta-prism to effectively generate an optical plane to which the alignment of other locations may be compared.

Preferably, the light source is placed in proximity to one end of the single mode optical fiber. A focusing means may be disposed between the light source and the end of the optical fiber. The focusing means may be a microscope objective or a microsphere that is operative to focus the light from the light source toward the end of the single mode optical fiber.

The single mode optical fiber may be of any convenient length and any convenient angular orientation along its length. Arbitrary bends along the length of the single mode optical fiber may be provided such that the second end of the single mode optical fiber may be physically offset from the first end and angularly aligned thereto. A substantial portion of the length of the single mode optical may be disposed within a protective means that may be rigid or flexible depending on the specified end use.

The second end of the single mode optical fiber is secured at a substantially fixed distance from the collimator substantially equal to the focal length of the collimator. The second end of the single mode optical fiber may be secured in a clamp mounted in fixed relationship to a collimating lens. The mounting for the collimating lens and the clamp for the second end of the single mode optical fiber may be secured in a single housing. The light source may also be mounted in the same housing as the second end of the single mode optical fiber, but such fixed spatial relationship between the first and second ends of the single mode optical fiber is not necessary.

The resulting combination of the light source, the single mode optical fiber and the collimator as described above results in a substantially perfectly stabilized beam emanating from the collimator regardless of the input attitude of the light to the first end of the single mode optical fiber. More particularly, an extremely spatially stable output beam emanates from the collimator without the complex and costly compensating devices provided by the prior art. Variations in the position or alignment of the single mode optical fiber at locations thereon spaced from the second end will have no effect on the spatial stability of the beam emanating from the collimator. Variations in the alignment of the light source to the first end of the single mode optical fiber or to the focusing means may affect the intensity of the light emanating from the collimator, but will not affect the spatial alignment and stability thereof.

As will be explained in detail below, it is envisioned that certain embodiments of the invention will incorporate the light source, the single mode optical fiber and the collimator in a single housing. Other embodiments will dispose the light source and the first end of the single mode optical fiber in substantially fixed relationship relative to one another while the second end of the single mode optical fiber and the collimator will be fixedly mounted relative to one another at a separate location. The single mode optical fiber may be either rigidly or flexibly mounted between these two locations. This latter arrangement may be particularly desirable for use in potentially explosive environments. In particular, the electrical power and the heat generating components can be isolated from the explosive environment. Thus, accurate alignment within the explosive environment can be achieved by the second end of the optical fiber and the collimator, neither of which require electricity to generate significant amounts of heat.

In a particularly preferred embodiment, the combination of the light source, the single mode optical fiber and the collimator will be used in combination with a target having photocell means responsive to the light source to produce electrical output signals capable of identifying locations of points at which the target is impinged upon by the light. These preferred embodiments may comprise laser light sources and in particular, solid state diode lasers. Additionally, a focusing means such as a microsphere may be disposed between the laser diode and the first end of the single mode optical fiber to focus the laser toward the first end of the fiber. The target employed in these embodiments may comprise readout means for identifying the locations at which the light impinges upon the target.

DETAILED DESCRIPTION OF THE PREFERRED EMBODIMENTS

Figure 1:
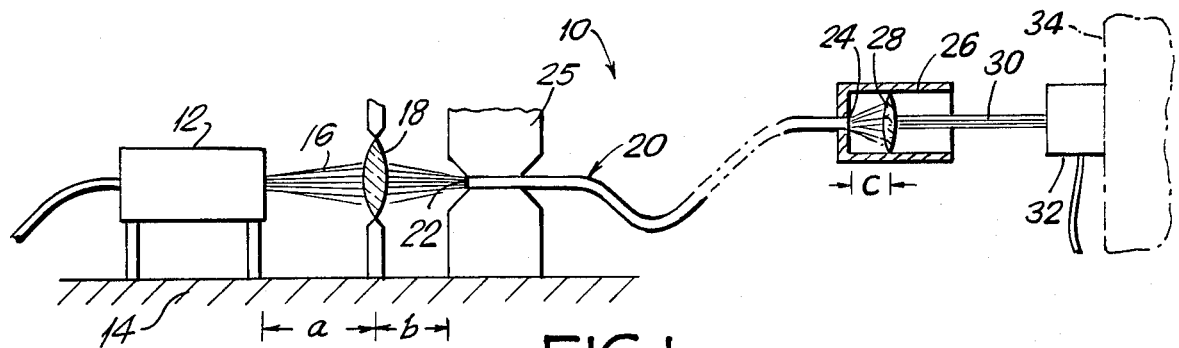
FIG. 1 is a schematic illustration of a first embodiment of applicant's invention.

The apparatus of the subject invention is indicated generally by the numeral 10 in FIG. 1. The apparatus 10 generally comprises a light source 12 securely mounted to a support 14. The light source is operative to produce a beam of light 16. More particularly, the light source 12 is depicted generally to identify a means for generating any of several acceptable forms of light beams 16. For example, the light source 12 may be operative to generate an infrared light beam. In a particularly preferred embodiment, however, the light source 12 is operative to generate a low power beam of laser light 16.

The apparatus 10 further includes a focusing aid 18 which is securely mounted to the support 14 at a distance "a" from the light source 12. The distance "a" is selected to enable a major portion of the light from source 12 to impinge upon the focusing aid 18. The focusing aid 18 may be a microscope objective or a microsphere with a focal length "b". Thus, the focusing aid 18 is operative to focus the beam of light 16 toward a location distance "b" therefrom.

A single mode optical fiber 20 having opposed first and second ends 22 and 24 is mounted to the apparatus 10 such that the first end 22 is disposed approximately distance "b" from the focusing aid 18. More particularly, the portion of the single mode optical fiber 20 adjacent the first end 22 thereof is seurely clamped by clamping means 24 such that the first end 22 is aligned with the light beam 16, and is spaced from the focusing aid 18 by a distance "b" substantially equal to the focal length of the focusing aid 18. As a result of this positioning of the first end 22 of the single mode optical fiber 20 relative to the focusing aid 18, a substantial part of the light beam 16 is focused directly at the first end 22 of the single mode optical fiber 20. Variations in the distances "a" and "b" caused by thermal expansion, manufacturing errors or the like may affect the intensity of the light impinging upon the first end 22 of the single mode optical fiber 20. However, these possible variations in intensity will not affect the operation or accuracy of the apparatus 10. Similarly, the angular alignment of the incoming light beam 16 and/or the angular alignment of the single mode optical fiber 20 adjacent end 22 thereof may have certain effects on the intensity of the light impinging upon the single mode optical fiber 20. However, these angular variations again will have no measurable effect upon the operation or accuracy of the apparatus 10.

The light from light source 12 impinging upon the first end 22 of the single mode optical fiber 20 will travel the entire distance through the single mode optical fiber 20 to the second end 24 thereof. The single mode optical fiber 20 will effectively reduce the light impinging on the first end to a single mode upon emission from the second end 24. The length of the single mode optical fiber 20 and the angular alignment of the single mode optical fiber 20 at various locations along its length has no effect upon the operation of the apparatus 10. However, in most applications the single mode optical fiber 20 will be fairly fragile, and a protection of some sort typically will be desired. This protection, however, need not be rigid. The second end 24 of the single mode optical fiber 20 is securely mounted in a housing 26 at a substantially fixed distance "c" from a collimator lens 28. The distance "c" between the second end 24 of the single mode optical fiber 20 and the collimating lens 28 is substantially equal to the focal length of the collimating lens 28. Additionally, the portion of the single mode optical fiber adjacent the second end 24 thereof will be substantially aligned with the axis of the collimating lens 28. As a result of this arrangement, the apparatus 10 produces a stable collimated beam of light 30 from the collimating lens 28 thereof. The beam of light 30 will remain substantially perfectly spatially stabilized despite changes in alignment and distance at locations in the apparatus 10 spaced from the housing 26. For example, movements in the portions of the single mode optical fiber 20 spaced from the second end 24 thereof will have absolutely no effect upon the spatial position of the collimated beam 30. Similarly, changes in the alignment of the beam 16 produced by the light source 12 and changes in the distances "a" or "b" between he light source 12 and the first end 22 of the single mode optical fiber 20 will have no effect at all upon the spatial position or stability of the collimated beam 30.

The apparatus 10 typically will be employed with an electronic target 32 which is operative to sense the center of energy of light impinging thereon and to produce electrical signals which identify the precise location of the center of energy. The target 32 typically will be mounted to a location on a member 34 which may be a machine or workpiece the location and alignment of which is to be determined.

Figure 2:
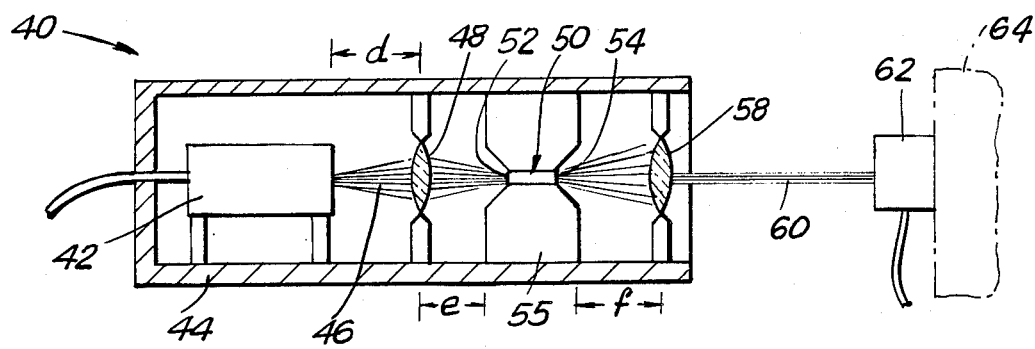
FIG. 2 is a schematic illustration of a second embodiment of applicant's invention.

An alternate embodiment of applicant's stabilized alignment apparatus is indicated generally by the numeral 40 in FIG. 2. The apparatus 40 includes a light source 42 securely mounted in a housing 44. The light source 42 is operative to generate a beam of light 46. As noted with the previous embodiment, the light source 42 may be a lasing apparatus, and the beam of light 46 may be a beam of laser light.

The apparatus 40 further comprises a focusing aid 48 securely mounted to the housing 40 at a distance "d" from the light source 42. The focusing aid 48 may be a microscope objective or a microsphere which is operative to focus the light 46 passing therethrough.

The apparatus 40 further includes a single mode optical fiber 50 having opposed first and second ends 52 and 54. More particularly, the first end 52 of the single mode optical fiber 50 is spaced from the focusing aid 48 by distance "e" which is substantially equal to the focal length of the focusing aid 48. The single mode optical fiber 50 is securely retained in a clamp 25. Unlike the previously described embodiment, both ends 52 and 54 of the single mode optical fiber 50 are disposed within the same housing 44, and the single mode optical fiber 50 is substantially rigidly retained along its entire length.

The apparatus 40 further comprises a collimating lens 58 securely mounted to housing 44 such that the distance "f" between the second end 54 of the single mode optical fiber 50 and the collimating lens 58 is substantially equal to the focal length of the collimating lens 58. More particularly, this distance "f" is maintained substantially constant by the secure mounting of both the single mode optical fiber 50 and the collimating lens 58 to the housing 44. As a result of this construction, a spatially stable collimated beam 60 emanates from the collimating lens 58. As noted previously, the spatial stability remains despite possible displacements or angular misalignments of the incoming light beam 46 relative to the focusing aid 48.

As explained with the previous embodiment, the apparatus 40 is employed with a target 62 that typically would be mounted to a workpiece, tool or other similar object 64, the location of which is to be precisely measured with respect to the collimated beam 60. The target 62 includes photocell means which is operative to sense the precise location of the beam 60 and to generate appropriate electrical signals corresponding to this location.

The apparatus 40 shown in FIG. 2 differs from the apparatus 10 shown in FIG. 1 primarily in that the light source 42, the focusing lens 48, the single mode optical fiber 50 and the collimating lens 58 all are disposed in the same housing. Thus, the apparatus 40 shown in FIG. 2 provides a single compact structure that may be more suitable for certain applications. In both instances, however, the apparatus produces a very stable light beam that is substantially unaffected by movements of members between the light source and the second end of the single mode optical fiber.

Figure 3:
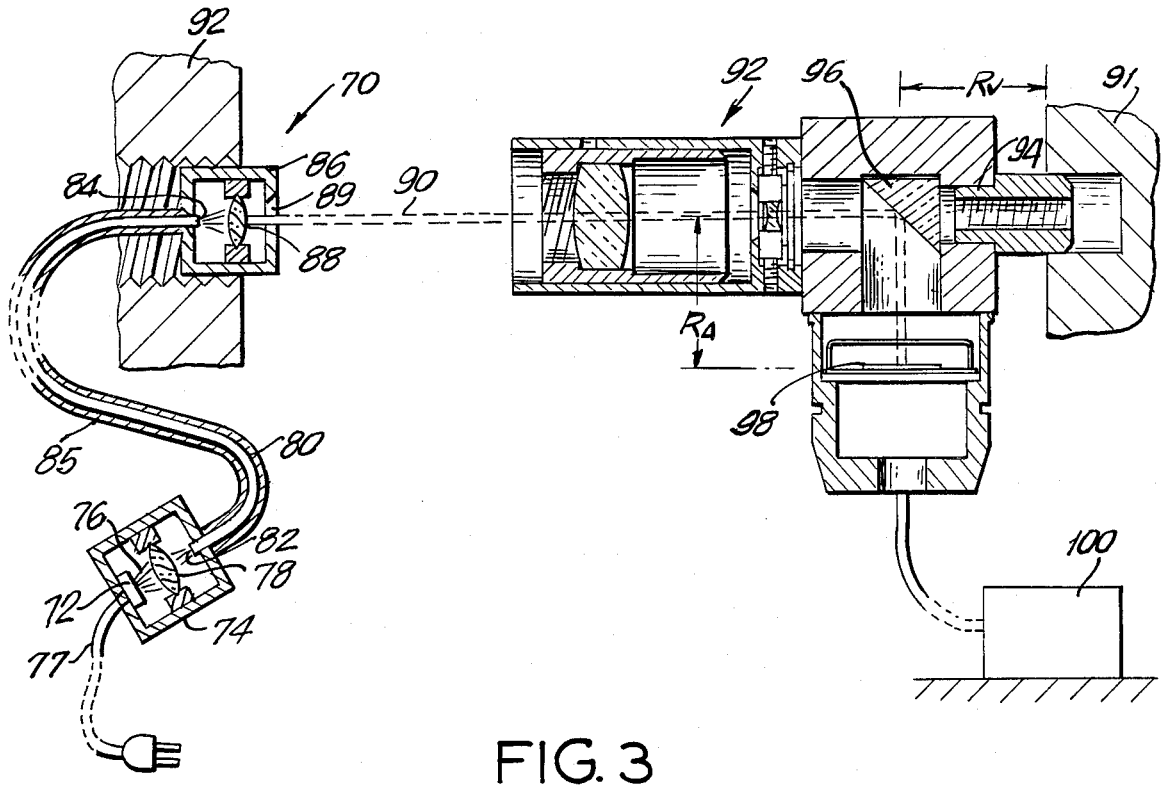
FIG. 3 is a schematic illustration of a third embodiment of the subject invention including a virtual target for detecting the center of energy of a light beam.

A particularly practical embodiment of the apparatus is indicated generally by the numeral 70 in FIG. 3. More particularly, the apparatus 70 comprises a diode laser 72 mounted in a housing 74 and operative to produce an infrared laser beam 76. The laser diode 72 is operatively connected to a power cord 77 which may be plugged into an electrical power source (not shown) to provide the necessary power for the diode laser 72. In certain embodiments, the housing 74 may include a replaceable battery to power the diode laser 72.

A microsphere 78 is securely mounted in the housing 74 and is operative to focus the laser light 76 emanating from the diode laser 72. A single mode optical fiber 80 having opposed first and second ends 82 and 84 also is provided. The single mode optical fiber is protectively disposed in a tubular member 85 which is flexible along its length but is non-compressible. The protective tubular member 85 may be similar to a BX cable covering and which may be metallic or an impact resistant plastic. The tubular member 85 is particularly important in explosive environments or other potentially damaging environments. The first end 82 of the single mode optical fiber 80 is securely mounted in the housing 74 and is spaced from the microsphere 78 by a distance substantially equal to the focal length of the microsphere 78. Although the solid state diode laser 72, the microsphere 78 and the first end 82 of the single mode optical fiber 80 all are securely mounted in the housing 74, variations in the respective positions and alignments will not affect the accuracy of the apparatus 70. As noted previously, environmental conditions are likely to cause such minor variations in the alignment of the components disposed within the housing 74.

The second end 84 of the single mode optical fiber 80 is securely mounted in housing 86. As illustrated schematically in FIG. 3, the single mode optical fiber 80 may have any convenient length and angular alignment between the first end 82 and the second end 84 thereof. A collimating lens 88 is securely mounted in the housing 86 at a distance from the second end 84 of the single mode optical fiber 80 substantially equal to the focal length of the collimating lens 88. The housing 86 is sufficiently structurally secure to maintain a substantially constant distance and angular alignment between the second end 84 of single mode optical fiber 80 and the collimating lens 88. This secure mounting can be fairly readily achieved because none of the components within the housing 86 are heat generating, and there will be no resulting differential thermal expansion across the housing 86. The housing 86 is further provided with a window 89 which is operative to prevent dirt or debris from being deposited upon the collimating lens 88.

The collimating lens 88 is operative to produce a collimated laser beam 90 therefrom. For the reasons explained above, the collimated laser beam 90 will be extremely stable despite variations in the attitude of the single mode optical fiber 80 or the optical members directing the laser beam into the first end 82 of the single mode optical fiber 80. The housing 86 typically would be mounted in member 92 which may be a tool holder, workpiece or the like. More particularly, the apparatus 70 is mounted to direct the collimated laser beam 90 to a target indicated generally by the numeral 92.

The target 92 typically will be mounted in a member 91, such as a workpiece, tool holder or such. More particularly, the target 92 shown in FIG. 3 is functionally and structurally substantially the same as the target shown in U.S. Pat. No. 4,483,618. The target 92 is provided with a mounting stud 94 which is dimensioned to be received within an aperture 95 or the like on the object 91. The target 92 further comprises a prism 96 which is operative to reflect the incoming laser beam 90 through an angle of 90° and toward a photocell means 98. The photocell means 98 is operative to sense the location of the center of energy of the laser beam reflected from the prism 96. Additionally, the photocell mean 92 is operative to generate electrical signals received by control means 100 and converted into digital indicia that can be readily interpreted by the user of the apparatus 70. As explained in U.S. Pat. No. 4,483,618, the target 92 is much more than a mere reflection of light from its initial path. Rather, the target 92 spaces the detector 98 from the original optical path a distance RA, and causes the target 92 to function as if the detector 98 were actually disposed at virtual location 99 which is an equivalent distance RV along the original optical path but beyond the reflective surface of prism 96. The target 92 may be mounted to object 91 such that the virtual location 99 is substantially in line with the entrance to the aperture 95 in object 91. Furthermore, the target 92 provides precise measurements despite possible angular variations of the target 92 relative to the surface 91. Thus, the combined apparatus shown in FIG. 3 is self-compensating for both misalignments occurring between the second end 84 of the single mode optical fiber 80 and the laser diode 72, and misalignments of the target 92.

In summary, an apparatus is provided for providing an extremely stable light beam without complex arrays of prisms and despite certain misalignment of components in the apparatus. The apparatus comprises a light source which may be a laser light source disposed in proximity to a focusing aid. The focusing aid is operative to direct the light into one end of a single mode optical fiber. The opposed end of the single mode optical fiber is disposed substantially in an accurate spatial and angular alignment with respect to a collimating lens. Specifically, the opposed end of the single mode optical fiber is disposed substantially at the focal length of the collimating lens. An electrical target that is operative to sense the locations of light energy impinging thereon is disposed in spaced relationship to the apparatus. The combination of the laser emitter and the target enables precise angular and positional alignments to be undertaken quickly and accurately.

While the invention has been described with respect to a preferred embodiment, it is apparent that various changes can be made thereto without departing from the scope of the invention as defined by the appended claims.

What is claimed is:

1. A spatially stable laser alignment apparatus comprising:
   laser means for producing a spatially unstable beam of laser light;
   focusing means disposed in proximity to said laser means for focusing the spatially unstable laser light;
   a single mode optical fiber having opposed first and second ends, said first end of said single mode optical fiber being disposed to receive the focused spatially unstable laser light passing through said focusing means, and being operative to produce a spatially stable beam of laser light emanating from the second end thereof;
   collimating meansddisposed in substantially fixed spatial and angular relationship to the second end of the single mode optical fiber for collimating the spatially stable laser beam emanating from the second end of said single mode optical fiber; and
   a target spaced from said collimating means and comprising photocell means responsive to the spatially stable laser beam for producing electrical output signals capable of identifying locations of points at which the target is impinged upon by the spatially stable laser geam, whereby the single mode optical fiber is operative to produce a spatially stable beam of laser light emanating from the second end thereof despite spatial instability of the laser light produced by the laser means.

2. An apparatus as in claim 1 wherein the laser is a solid state diode laser.

3. An apparatus as in claim 1 wherein the laser the focusing aid, the single mode optical fiber and the collimating means are securely mounted relative to one another in a single housing.

4. An apparatus as in claim 1 wherein the laser the focusing aid and the first end of the single mode optical fiber are securely mounted in a first housing and wherein the second end of the single mode optical fiber and the collimator are securely mounted in a second housing, said second housing including means for securely mounting the second housing to a machine tool or workpiece.

5. An apparatus as in claim 1 wherein the single mode optical fiber is disposed in a tubular protective member.

* * * * *